United States Patent [19]
Niijima

[11] Patent Number: 5,900,914
[45] Date of Patent: May 4, 1999

[54] HORIZONTAL SYNCHRONIZING SIGNAL-GENERATING CIRCUIT AND METHOD THEREFOR

[76] Inventor: Shinji Niijima, Tokyo, Japan

[21] Appl. No.: 08/780,174

[22] Filed: Dec. 26, 1996

[30] Foreign Application Priority Data

Dec. 27, 1995 [JP] Japan .................................. 7-341522

[51] Int. Cl.[6] .............................. H04N 5/00; H04N 5/06; H04N 5/08; H04N 5/10
[52] U.S. Cl. .......................... 348/521; 348/521; 348/524; 348/531; 348/540; 358/148; 358/153; 358/158
[58] Field of Search ..................................... 348/521, 524, 348/531, 540, 530, 533, 536, 542, 543, 545, 546; 358/148, 153, 158; H04N 5/00, 5/06, 5/08, 5/10

[56] References Cited

U.S. PATENT DOCUMENTS

| | | | |
|---|---|---|---|
| 4,328,513 | 5/1982 | Furihato et al. | 348/521 |
| 5,144,432 | 9/1992 | Higashitsutsumi | 348/525 |
| 5,208,672 | 5/1993 | Konishi et al. | 348/521 |
| 5,633,688 | 5/1997 | Choi et al. | 348/584 |
| 5,790,200 | 8/1998 | Tsujimoto et al. | 348/533 |

FOREIGN PATENT DOCUMENTS

| | | | |
|---|---|---|---|
| 55-79583 | 6/1980 | Japan . | |
| 62-82776 | 4/1987 | Japan . | |
| 63-158975 | 7/1988 | Japan . | |
| 2-246685 | 10/1990 | Japan . | |
| 3-245679 | 11/1991 | Japan . | |
| 4-313962 | 11/1992 | Japan . | |
| 8-111789 | 4/1996 | Japan . | |
| 2140240 | 11/1984 | United Kingdom | 358/158 |

*Primary Examiner*—John K. Peng
*Assistant Examiner*—Paulos M. Natnael

[57] ABSTRACT

A horizontal synchronization signal generating circuit self-generates a horizontal synchronization signal if an actual horizontal synchronization signal fails to be detected in a composite video signal. Each time an edge-detection circuit detects an actual horizontal synchronization pulse, a counter and decoder are reset. An actual horizontal synchronization signal has a period of 63.5 $\mu$s. If the edge detection circuit fails to detect the actual horizontal synchronization signal, then the decoder outputs a self-generated horizontal synchronization signal at 64 $\mu$s and a selector circuit disables the edge detection circuit for approximately 35 $\mu$s. In contrast, if the edge-detection circuit detects an actual horizontal synchronization signal, the decoder is reset before it can output the self-generated signal and the selector disables the edge detection circuit for approximately 60 $\mu$s. Accordingly, a period of 35 $\mu$s exists during which an edge-detecting signal is disabled after a horizontal synchronizing output produced by self-generation has been outputted. The disabling period allows detection of horizontal synchronizing inputs when narrow pulse signals are lost during vertical synchronous periods, and allows immediate extraction of the horizontal synchronizing inputs regardless of the difference of the odd/even fields and allows outputting of the corresponding horizontal synchronizing output.

25 Claims, 9 Drawing Sheets

FIG.3A ODD FIELD

FIG.3B EVEN FIELD

FIG.9A
RELATED ART ODD FIELD

FIG.9B
RELATED ART EVEN FIELD

HORIZONTAL SYNCHRONIZING SIGNAL-GENERATING CIRCUIT AND METHOD THEREFOR

BACKGROUND OF THE INVENTION

1. Field of the Invention

The present invention generally relates to a horizontal synchronizing signal-generating circuit and, more particularly, to a horizontal synchronizing signal-generating circuit for separating and generating horizontal synchronizing signals from composite synchronizing signals for television or video tape recorder (VTR) images and the like.

2. Description of the Related Art

Composite synchronizing signals generally include horizontal synchronizing ("sync") signals and vertical synchronizing signals. Each of these synchronizing signals is a signal for indicating a timing for television (hereafter "TV") systems to scan pictures on cathode ray tubes (CRTs).

Specifically, the baseband signal for television is a composite of the visual information signals and synchronization signals. The visual information is transmitted as three signal components including a Y-luminance component, an I-chrominance component, and a Q-chrominance component. The I-chrominance and Q-chrominance components together convey information on the hue or tint and on the amount of saturation of the coloring which is present (assuming a color receiver/monitor). Monochrome receivers only require the Y-component.

The synchronization signal consists of narrow pulses at the end of each line scan for horizontal synchronization, and a sequence of narrower and wider pulses at the end of each field scan for vertical synchronization. Additional synchronization for the color information demodulation in the receiver is superimposed on the horizontal pulses as mentioned below.

Horizontal synchronizing signal-generating circuits are circuits for separating horizontal synchronizing signals from such composite synchronizing signals.

Figure 6:
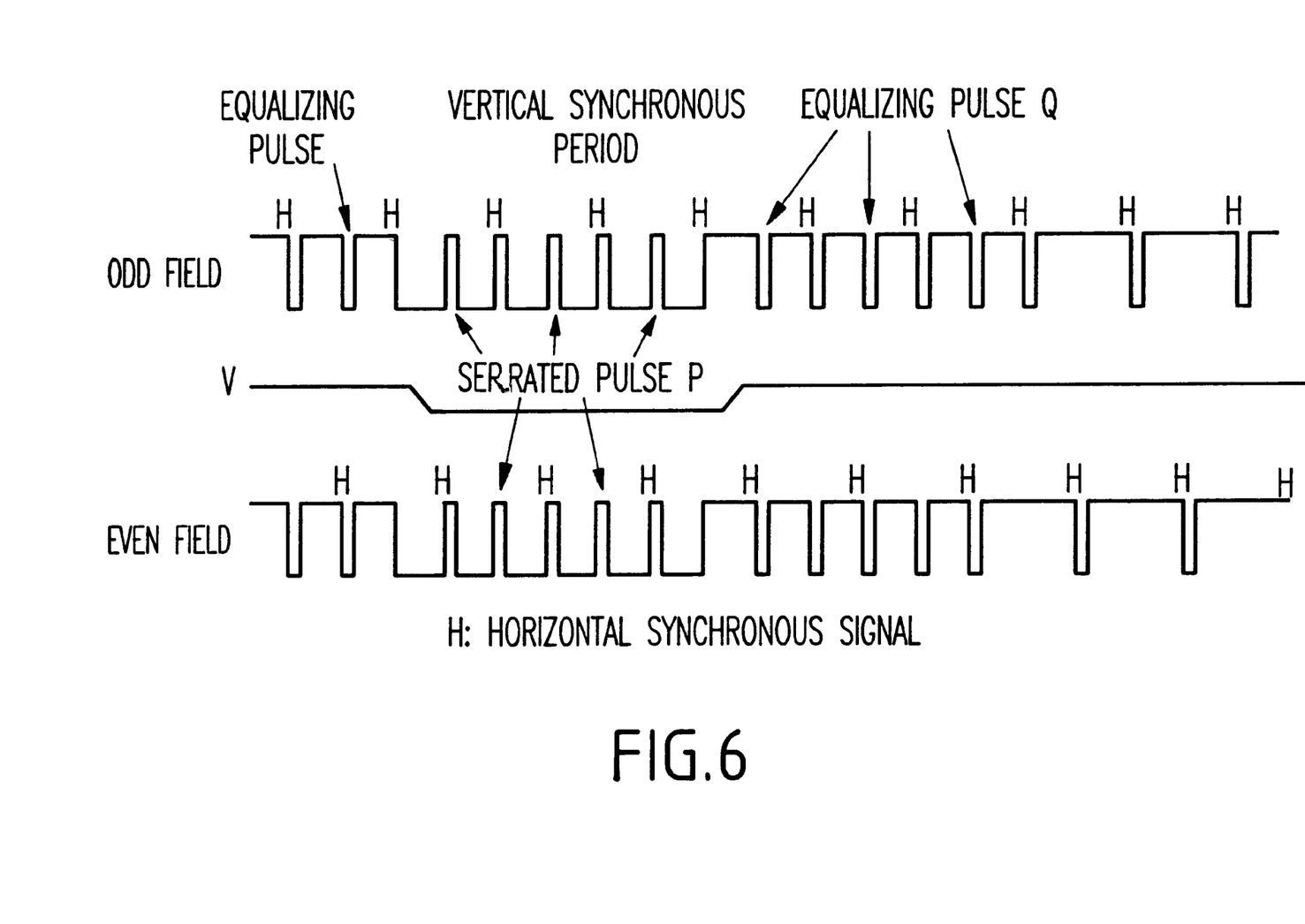
FIG. 6 illustrates theoretical waveforms of composite synchronizing signals.

Referring to FIG. 6 which illustrates waveforms of composite synchronizing signals, the composite synchronizing signals include the above-mentioned horizontal synchronizing signals H and vertical synchronizing signals V. These horizontal and vertical synchronizing signals are for initializing horizontal (e.g., side-to-side) scanning with a timing provided by the horizontal synchronizing signals H, and for initializing vertical (e.g., up-and-down) scanning with a timing provided by the vertical synchronizing signals V.

The composite synchronizing signals (e.g., H and V) are extracted from composite picture signals received and decoded by TV tuners. Occasionally, disturbances occur depending on the state of the radio waves at the time of reception, including superimposition of noise, loss of some synchronizing signals, etc. This is an important consideration when the configuration and the function of a horizontal synchronizing signal-generating circuit are designed.

Besides horizontal and vertical synchronizing signals, composite synchronizing signals also include additional signals referred to as "serrated pulses P" and "equalizing pulses Q" near (adjacent) the vertical synchronizing signals V. Serrated pulses P are for indicating the horizontal pulses, whereas equalizing pulses Q are for recognizing the vertical synchronous period (e.g., they are input only around (adjacent) the vertical synchronous period). The equalizing and serrated pulses serve to stabilize the horizontal synchronizing inputs and may be set to a predetermined (e.g., two times) value of the frequency of the horizontal synchronizing inputs. Thus, these pulses serve to provide continuity to the horizontal inputs during a blanking period.

Additionally, there are two patterns of composite synchronizing signals referred to as an "odd field" and an "even field" due to a phase difference between the horizontal synchronizing signals H and the vertical synchronizing signals V. For purposes of this application, an "odd field" pattern is the pattern represented by the odd-numbered lines scanned, whereas an "even field" pattern is the pattern represented by the even-numbered lines scanned. As mentioned above, horizontal synchronizing signal-generating circuits have the function of extracting horizontal synchronizing signals from composite synchronizing signals.

Hereinafter, for convenience and brevity, the horizontal synchronizing signals, inputted as components of composite synchronizing signals, and the extracted and outputted horizontal synchronizing signals, are referred to simply as "horizontal synchronizing inputs" and "horizontal synchronizing outputs", respectively. Further, the periods during which vertical synchronizing signals are inputted are referred to simply as "vertical synchronization periods". The Q pulses are output only around (e.g., adjacent) the vertical synchronizing period.

Figure 7:
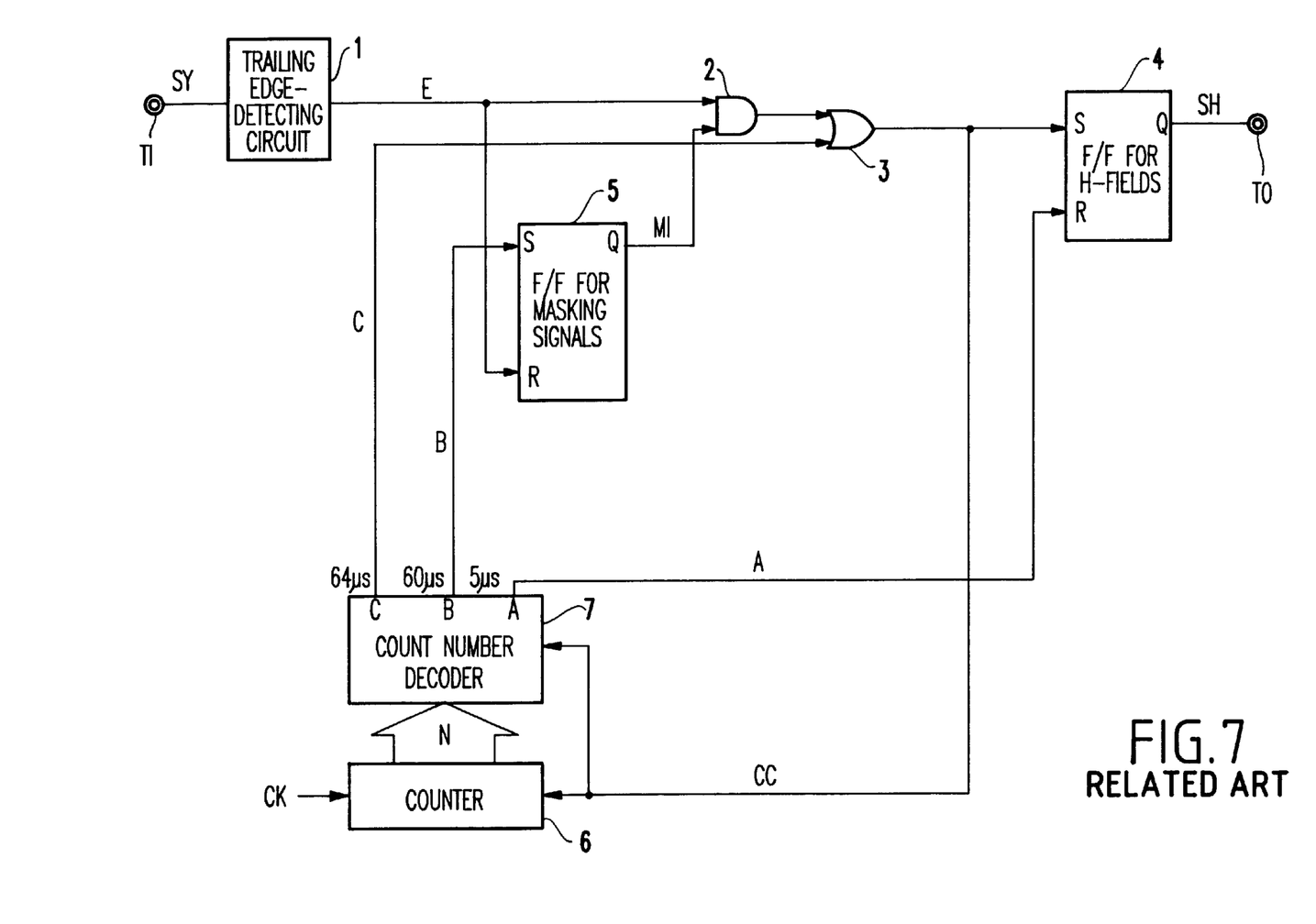
FIG. 7 is a block diagram illustrating an exemplary conventional horizontal synchronizing signal-generating circuit.

Referring to FIG. 7, a conventional horizontal synchronizing signal-generating circuit includes a trailing-edge detecting circuit 1 which detects a transition of composite synchronizing signals from a high-level (e.g., a "1") to a low-level (e.g., a "0"), thereby to output a pulse-like, edge-detecting signal E. A counter 6 counts up the pulse number of a count clock CK and initializes the count number to zero by a counter-clearing signal CC.

A count number decoder 7 monitors the count of the counter 6, and sets an H-output reset signal A, a mask-canceling signal B and a self-generated output signal C, respectively, when the count number N has reached first through third settings ("1").

Briefly, the first setting is a value such that matching occurs 5 μs after initialization of the counter 6, since the pulse width of the horizontal synchronizing inputs of the composite synchronizing signal SY is on the order of 5 μs, as mentioned below.

The second setting is for preventing false inputting of the composite synchronizing signal SY due to noise, etc., and as mentioned below is usually set to approximately 93–95% of the cycle of the horizontal synchronizing inputs (e.g., an "approximate" horizontal synchronization signal).

Figure 8A:
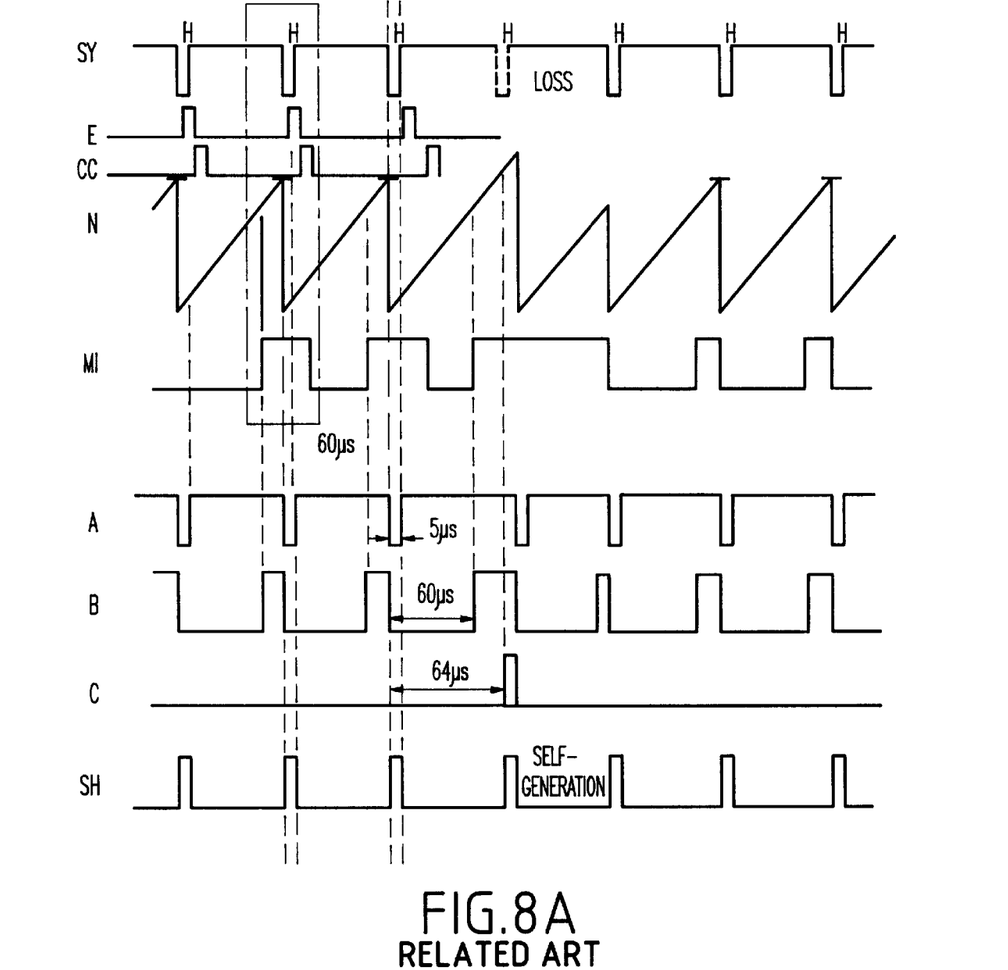
FIG. 8(A) is a time chart illustrating an exemplary operation of the conventional horizontal synchronizing signal-generating circuit of FIG. 7.
Figure 8B:
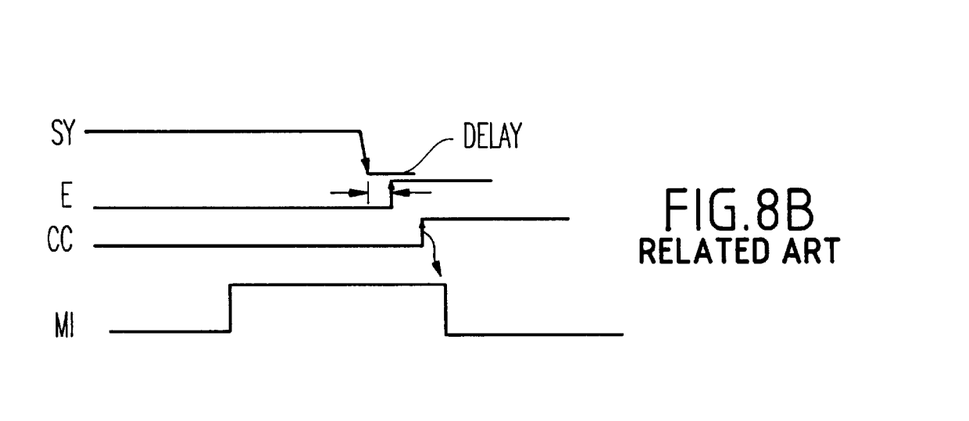
FIG. 8(B) illustrates expanded wave forms of the area surrounded with broken line shown in FIG. 8(A)

The third setting is a value indicating the cycle of the horizontal synchronizing inputs (e.g., approximately 63.5 μs or 64 μs as shown in FIGS. 8(A) and 8(B)).

The count number decoder 7 resets the signals A, B and C in response to the counter-clearing signal CC ("0").

A flip-flop 5 masks signals (hereafter termed "the F/F for masking signals") from the trailing-edge detecting circuit 1 and the count number decoder 7. Specifically, flip-flop 5 sets an input-masking signal MI in response to the generation of the mask-canceling signal B, and resets the input-masking signal MI in response to supply of the trailing edge-detecting signal E.

After generation of SH, there is no masking signal generated so that an outside SY may be input to create noise. The conventional circuit takes the first trailing edge after the vertical synchronous period which may be an H or Q signal. Then, the detector detects Q for the H synchronizing signal until a pulse is lost and the circuit resynchronizes itself.

An AND gate 2 performs a logical-AND operation between the edge-detecting signal E and the input-masking signal MI. An OR gate 3 performs a logical-OR operation between the output of the AND gate 2 and the self-generated output signal C from the count number decoder 7.

A flip-flop 4 for H-signals (horizontal sync signals) (hereafter termed "the F/F for H-signals") sets the horizontal synchronizing output SH of the output in response to a high-level output through the OR gate 3, and resets the horizontal synchronizing output SH in response to the high level of the H-output reset signal A.

Below, the operation of the conventional horizontal synchronizing signal-generating circuit will be explained with reference to FIG. 7 and to FIGS. 8(A)–8(B) which is a time chart illustrating waveforms at individual sections of the conventional circuit.

The trailing-edge detecting circuit 1 generates an edge-detecting signal E upon detection of a trailing edge of the composite synchronizing signal SY.

With this edge-detecting signal E, the output through the AND gate 2 is switched to a high level "1" (assuming that the input-masking signal MI is at a high level "1"), and the counter-clearing signal CC outputted through the OR gate 3 is switched to a high level ("1") as well. The counter-clearing signal CC initializes the counter 6 to zero, and simultaneously sets the F/F for H-signals 4 to switch the horizontal synchronizing output SH to a high level.

Simultaneously (e.g., in parallel), the edge-detecting signal E resets the F/F for masking signals 5. Therefore, the input of the edge-detecting signal E is disabled from this time until generation of a mask-cancelling signal B. Additionally, the counter-clearing signal CC initializes the outputs A, B and C of the count number decoder 7 to respective low levels simultaneously with the initialization of the counter 6. It is noted that the FF 5 has a certain delay therein which allows MI to go high substantially instantaneously with the trailing edge detection signal.

The counter 6, after having been initialized by the counter-clearing signal CC, restarts counting-up upon input of a counter clock CK pulse from a clock (not illustrated). Then, the count number decoder 7 begins monitoring to detect whether the count number N of the counter 6 is equal to the first setting. When a match is detected (e.g., count number N of the counter 6 is equal to the first setting), the count number decoder 7 switches the H-output reset signal A to a high level.

In response to the H-output reset signal A, the F/F 4 for H-signals is reset, and the horizontal synchronizing output SH of the output is switched to a low level (e.g., "0"). As mentioned above, since the pulse width of the horizontal synchronizing inputs of the composite synchronizing signal SY is on the order of 5 $\mu$s, the first setting is set to such a value that matching occurs 5 $\mu$s after initialization of the counter 6.

When the above operation is completed, a first horizontal synchronizing input is extracted from the composite synchronizing signal SY.

When the counter 6 continues counting up, and the count number N matches the second setting, a mask-canceling signal B is generated, and the F/F 5 for masking signals sets an input-masking signal MI.

It is noted that the relationship between the counter 6 and the outputs A, B, and C is determined by whether they match or not. For example, when the output of the decoder "matches the second setting" "B" is output. Thus, the respective first, second and third settings of the clock counter (e.g., the first second or third clock counts) triggers outputs A, B, and C.

Here, the edge-detecting signal E outputted through the trailing-edge detecting circuit 1 is enabled. That is, as mentioned above, the second setting is the period during which the edge-detecting signal E is disabled, to prevent false inputting of the composite synchronizing signal SY due to noise, etc. As further mentioned above, the second setting is usually set to approximately 93–95% of the cycle of the horizontal synchronizing inputs (e.g., approximately 63.5 $\mu$s), or 60 $\mu$s in this case.

When the composite synchronizing signal SY has no loss of horizontal synchronizing input, the trailing-edge-detecting circuit 1 detects a trailing edge of the composite synchronizing signal SY and outputs a trailing-edge-detecting signal E before the count number N attains the third setting.

In response to the output of the edge-detecting signal E, the OR gate 3 sets a counter-clearing signal CC to initialize the counter 6 to zero. The initialization of the counter 6 results in resetting the respective output signals A–C of the count number decoder 7 as well. Subsequent operation is the same as described above, and thus reference thereto is omitted. The disablement period allows the horizontal synchronizing inputs to be identified immediately after the vertical synchronous period.

The composite synchronizing signal SY may lose some portions when the receiving state of the respective radio wave is temporarily impaired. To counter such a loss, self-generation of the horizontal synchronizing output SH may be performed, as discussed below and as shown in the waveform of FIGS. 8(A) and 8(*b*).

Specifically, since no edge-detecting signal E is generated even after the input-masking signal MI has been switched to a high level, the AND gate 2 remains at the low level, and no counter-clearing signal CC is generated. Therefore, the counter 6 continues the counting operation.

Then, when the count number of the counter 6 matches the third setting of the count number decoder 7, the self-generated output signal C is switched to a high level, and thus the output of the OR gate 3 is switched to a high level as well.

This results in almost the same state as when an edge-detecting signal E has been generated, and the counter-clearing signal CC initializes the counter 6 and the count number decoder 7, while the F/F 4 for H-signals switches the horizontal synchronizing output SH to a high level. The only difference between the above-described state and when an edge-detecting signal E is generated is that the F/F 5 for masking signals is not reset. Accordingly, trailing edges of the composite synchronizing signals SY inputted after this point in time are received without error.

Thus, when the composite synchronizing signal SY has some lost portions and self-generation of the horizontal synchronizing output SH is performed, the composite synchronizing signals SY inputted thereafter are not ignored and are received preferentially.

As described above, the conventional horizontal synchronizing signal-generating circuit, including the trailing-edge detector 1, detects trailing edges of composite synchronizing signals SY from an external source, and outputs horizontal synchronizing outputs SH. Further, after detection of the edges, the process enters input-masking terms to prevent malfunction due to noise, radio wave impairment, etc. Additionally, the circuit self-generates the horizontal synchronizing outputs SH in preparation for times when the composite synchronizing signals SY lose some portions thereof (or are completely lost).

However, when VTR sets are actually used (as well as broadcast TV signals), horizontal synchronizing signals, serrated pulses, equalizing pulses, etc. are sometimes not inputted during periods of vertical synchronizing signals. This is a problem.

Figure 3A:
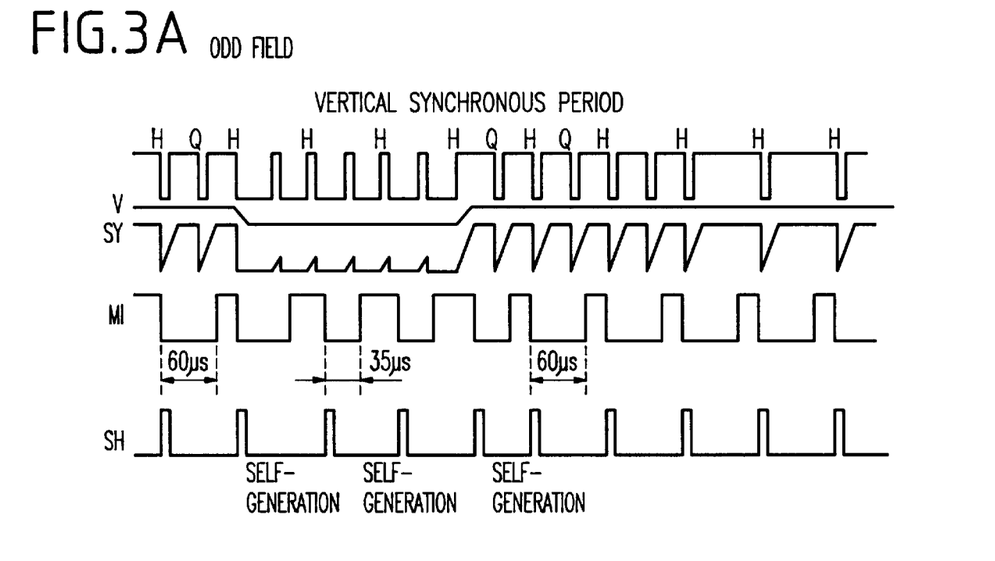
FIGS. 3(A) and 3(B) illustrate timing charts for showing the relationship among the input waveform, the input-disabled period and the horizontal synchronizing output for each of the odd field and the even field, respectively.
Figure 3B:
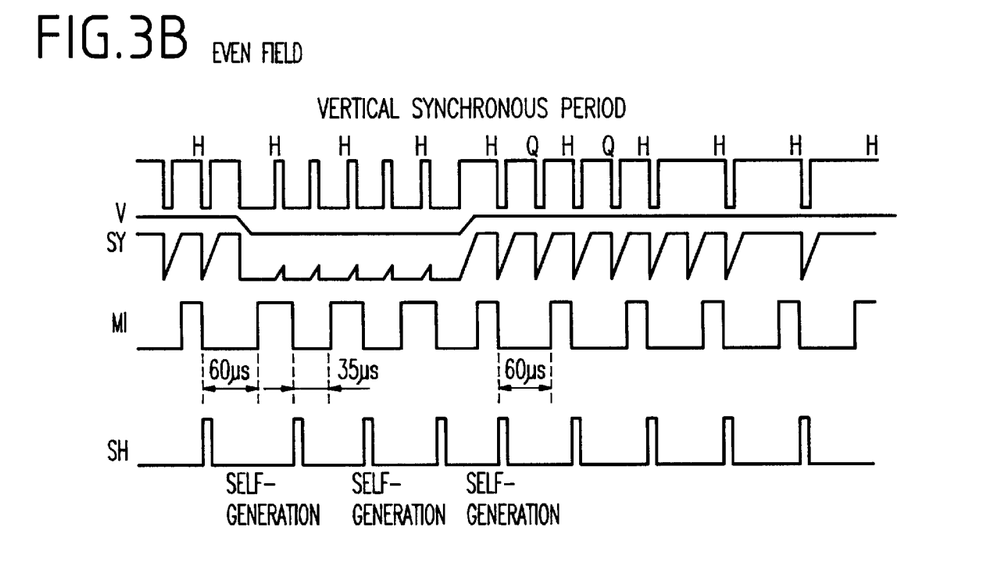

Specifically, the waveform of inputted composite synchronizing signals becomes flat (e.g., even) due to great attenuation of the above pulse level during vertical synchronous periods, as shown in FIGS. 3(A) and 3(B), depending on the method of establishing a connection between the output device (not shown) for the composite synchronizing signals and the input terminal TI for the composite synchronizing signals.

For example, when the composite synchronizing signal-transmitting signal line is connected to a power supply via a pull-up resistor, the impedance at the output end changes at the low level as well as the high level, and since this results in a longer transition time from the low-level to the high-level than the transition time from the high-level to the low-level, the narrow pulses at the high-level become flat.

Further, due to the phase relationship between the vertical synchronous terms and the horizontal synchronizing inputs, the composite synchronizing signals are of two types, the odd field and the even field, as shown in FIG. 6.

The above considerations (e.g., the narrow pulses at the high-level becoming flat and the composite synchronizing signals being of the odd field-type and the even field-type) cause the following problems.

Namely, input of composite synchronizing signals of waveforms with loss of narrow pulses such as horizontal synchronizing signals and equalizing pulses during vertical synchronizing signal periods as described above, always results in output of horizontal synchronizing outputs SH by self-generation during the vertical synchronous periods, and thus in receipt of trailing-edges of later-inputted composite synchronizing signals SY as horizontal synchronizing inputs.

However, since the vertical synchronous terms and the horizontal synchronous inputs have two phase relationships, equalizing pulses are erroneously received as horizontal synchronous inputs only in the case of the odd field. The "even field" will not face such problems since the first pulse immediately after the vertical synchronous period is always the horizontal pulse for the "even field".

Since composite synchronizing signals of waveforms with lost narrow pulses, including horizontal synchronizing inputs, are inputted during vertical synchronous periods, self-generated horizontal synchronizing inputs are outputted during vertical synchronous periods without exception. Additionally, the trailing-edges of the later-inputted composite synchronizing signals are always recognized as the horizontal synchronous inputs to erroneously receive equalizing pulses as the horizontal synchronous inputs in the case of the odd field.

Figure 9A:
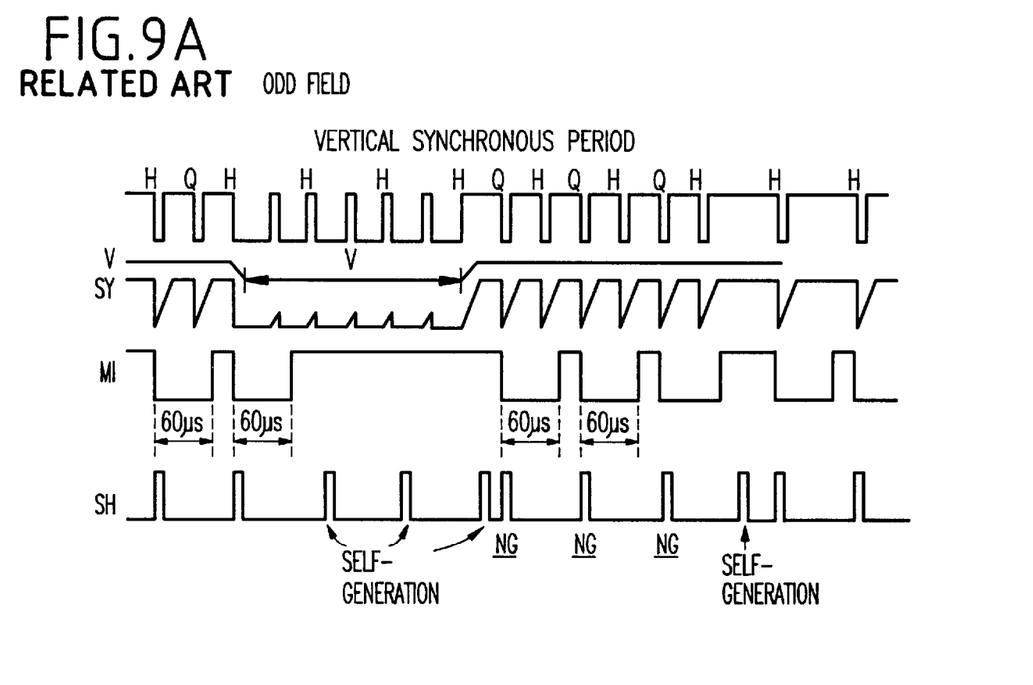
FIGS. 9(A) and 9(B) illustrate timing charts for showing the relationship among the input waveform, the input-disabled period and the horizontal synchronizing output for each of the odd field and the even field, respectively; in the conventional circuit.
Figure 9B:
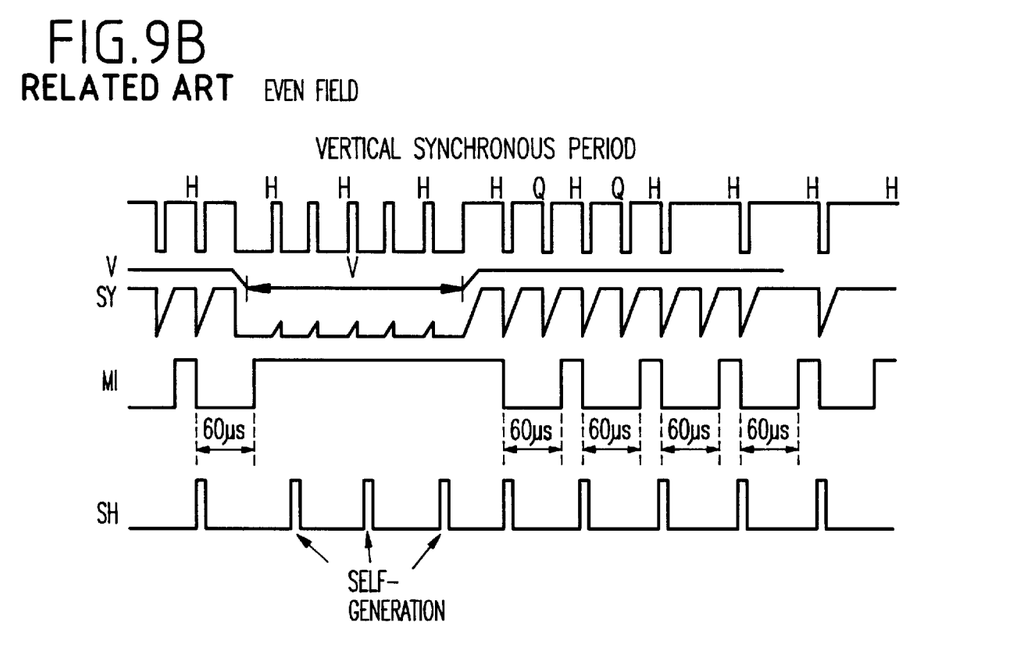

Referring to FIGS. 9(A) and 9(B), the relationship among the composite synchronizing signal SY with lost narrow pulses during the vertical synchronous periods, the input-masking signal MI and the horizontal synchronizing signal SH for each of the odd/even fields, and the operation for extracting the horizontal synchronizing inputs is shown for the odd field and the even field. As shown and as mentioned above, with the conventional circuit, horizontal synchronizing inputs may be extracted erroneously immediately after the vertical synchronous periods.

In view of the foregoing, the above conventional horizontal synchronizing signal-generating circuit cannot extract the horizontal synchronizing inputs immediately after the vertical synchronous periods, and the corresponding horizontal synchronizing outputs cannot be outputted. As a result, horizontal synchronization is not efficiently performed and indeed may be improperly performed.

Moreover, after generation of the SH signal, there is no masking signal MI generated so that an outside SY signal may be input to create noise.

SUMMARY OF THE INVENTION

In view of the foregoing problems of the conventional circuit, it is an object of the present invention to provide a method and horizontal synchronizing signal-generating circuit which accurately and immediately extracts horizontal synchronizing inputs after vertical synchronous periods.

Another object of the present invention is to provide a method and horizontal synchronizing signal-generating circuit which outputs the corresponding horizontal synchronizing signals even when composite synchronizing signals with lost narrow pulses are inputted during vertical synchronous periods, regardless of whether they are odd field or even field.

In a first aspect of the present invention, a horizontal synchronizing signal-generating circuit includes a count number decoder, having a first setting and a plurality of second settings corresponding to self-generated output times, which outputs, in response to the counted value respectively matching each of the first and second settings, a first match-indicating signal and a plurality of second match-indicating signals, and initializes the plurality of second match-indicating signals in response to supply of a counter-clearing signal.

Also provided are a first logical circuit which inputs an edge-detecting signal and an input-masking signal, and enables or disables the edge-detecting signal in response to the level of the input-masking signal to output a first logical signal, and a second logical circuit which performs a logical operation (e.g., OR) between the first match-indicating signal and the first logical signal to output a second logical signal.

Preferably, the invention further includes a selector which selects one of the second match-indicating signals to output it as the input-masking signal, and a selector controller for inputting the first match-indicating signal and the first logical signal to switch between the operations of the selector, so as to change the period during which the edge-detecting signal is disabled depending on whether the composite synchronizing signal is normally inputted, or the horizontal synchronizing output signal has been self-generated in response to an abnormal input.

The invention also preferably includes an edge-detecting circuit which detects, in response to supply of a composite synchronizing signal including a horizontal synchronizing signal and a vertical synchronizing signal, the edge (e.g., trailing edge, but alternatively the leading edge) of the composite synchronizing signal. A counter counts clock signals to output a counted value, and initializes the counted value to a predetermined value (e.g., zero) in response to supply of a counter-clearing signal. An output device increases a desired horizontal synchronizing output signal in response to supply of the second logical signal and terminates (e.g., drops) the signal after a predetermined time period, and separates the horizontal synchronizing signal from the composite synchronizing signal to generate the horizontal synchronizing signal.

With the unique and unobvious structure and method of the invention, the horizontal synchronizing signal-generating circuit accurately and immediately extracts horizontal synchronizing inputs after vertical synchronous periods.

Further, the circuit outputs the corresponding horizontal synchronizing signals even when composite synchronizing signals with lost narrow pulses are inputted during vertical synchronous periods, and regardless of whether they are odd field or even field.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
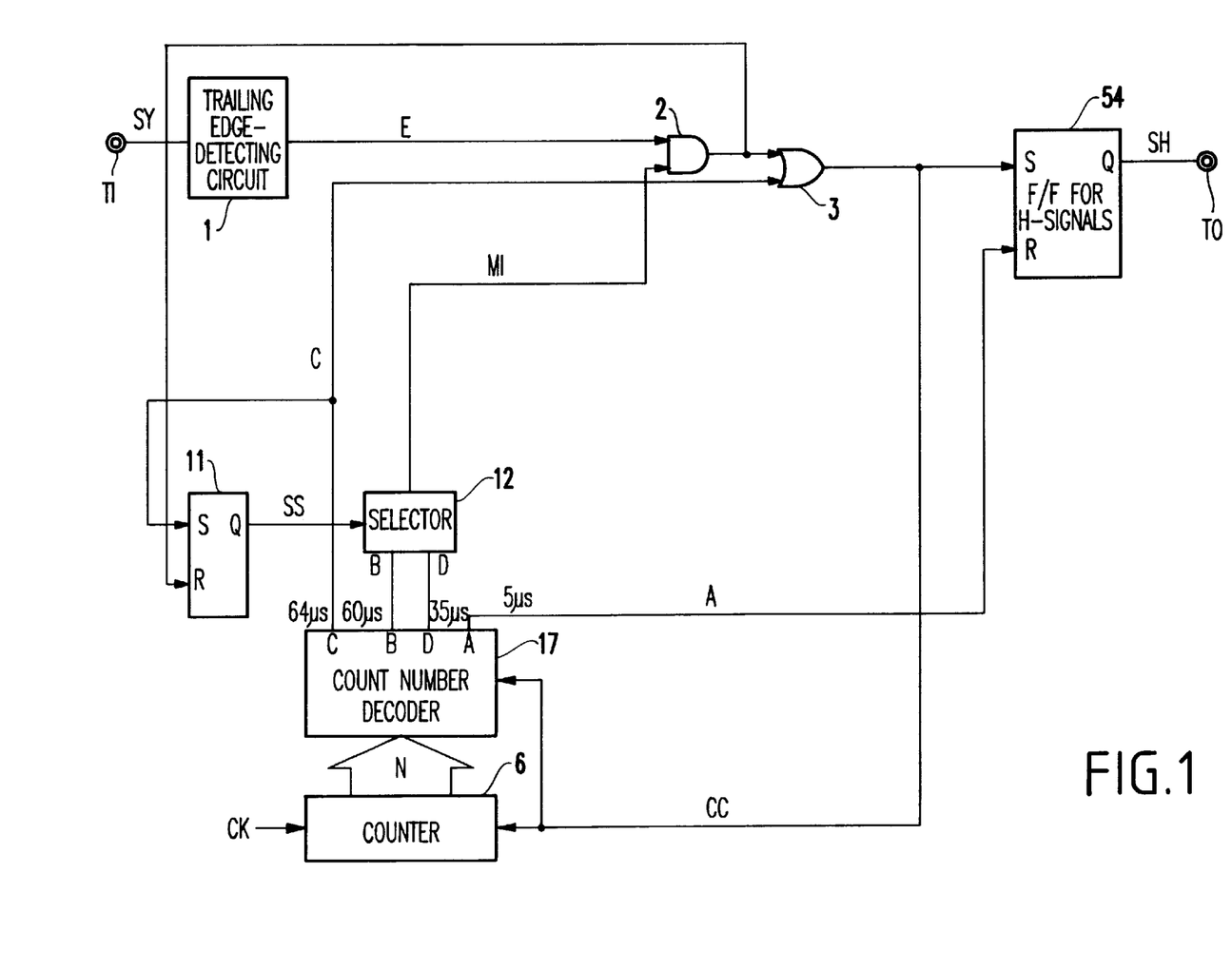
FIG. 1 is a block diagram illustrating a first embodiment of the horizontal synchronizing signal-generating circuit according to the present invention.

Referring now to the drawings, and more particularly to FIG. 1, there is shown a block diagram illustrating a horizontal synchronizing signal-generating circuit according to a first embodiment of the present invention. In FIG. 1, the same components as illustrated in FIG. 7 are indicated by the same reference numerals and letters.

As shown in FIG. 1, the inventive horizontal synchronizing signal-generating circuit includes a trailing edge-detecting circuit 1, an AND gate 2, an OR gate 3, an F/F 4 for H-signals and a counter 6 which are the same as the conventional circuit shown in FIG. 7. It is noted that while the circuit 1 is described as detecting the trailing edge of the composite signal SY, the leading edge could alternatively be detected and used by the invention.

Further, the inventive circuit includes a selecting flip-flop 11 or setting an output-selecting signal SS in response to the high level of a self-generated output signal C and resetting the signal SS in response to the high level of the output through the AND gate 2 (hereunder, referred to as the "selecting F/F 11").

Additionally, a selector 12 is provided for selecting either of the output signals B and D from a count number decoder 17 in response to the level of the selecting signal SS, to output an input-masking signal MI. Specifically, if the level of the selecting signal SS is "low", then the output signal B is selected. Conversely, if the level of the selecting signal SS is "high", then the output signal D is selected.

The count number decoder 17 is substituted for the count number decoder 7 of the conventional circuit, and is modified to have a fourth setting (signal D) in addition to the same first through third settings (signal A through signal C) described above with regard to the conventional circuit. The invention also omits the conventional F/F 5 for masking signals.

The additional signal D of the count number decoder 17 is a disabling signal which disables equalizing pulses which are inputted between the horizontal synchronizing inputs. As discussed below, signal D allows the inventive circuit to immediately extract horizontal synchronizing inputs after vertical synchronous periods. Preferably, the width of this disabling signal is usually set to be half the cycle of the horizontal synchronizing inputs +α (e.g., approximately 35 μs according to the present embodiment).

The selector 12 selects the output signal B from the count number decoder 17 when the selector signal SS is at a low level (e.g., "0"), and selects the signal D for the high level (e.g., "1").

Referring to FIG. 1 and to FIG. 2 which is a timing chart illustrating waveforms at individual sections of the inventive circuit, the operation of the horizontal synchronizing circuit according to the first embodiment will now be described. Since this embodiment differs from the conventional circuit primarily in when the edge-detecting signal E is enabled or disabled, the description below will focus on this difference.

Figure 2:
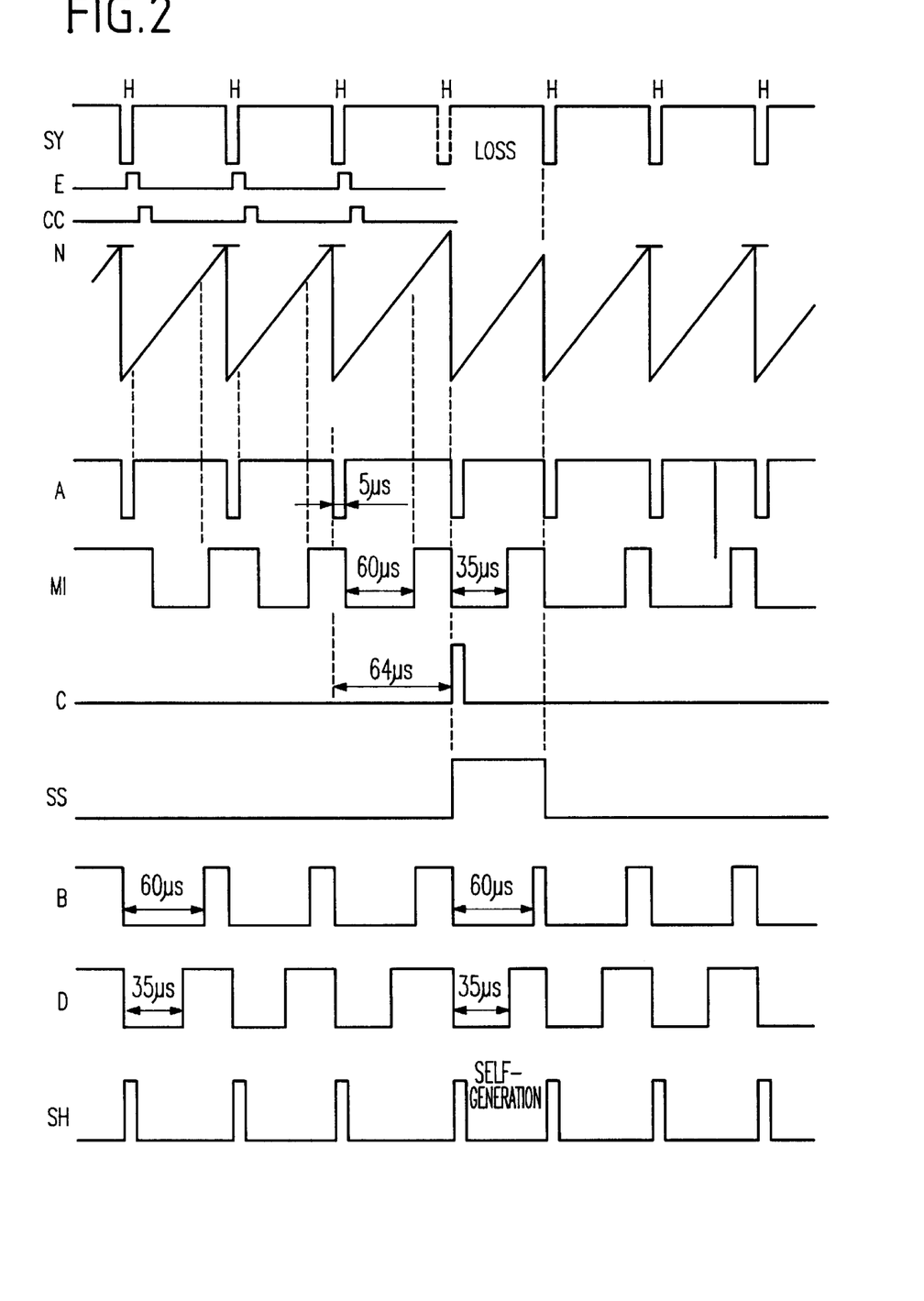
FIG. 2 is a timing chart illustrative of an example of the operation of the horizontal synchronizing signal-generating circuit shown in FIG. 1 according to the present invention.

First, referring to FIG. 2, when the composite synchronizing signal SY is free of disturbances such as loss of horizontal synchronizing inputs or the like, since the counter 6 is periodically initialized by a counter-clearing signal CC from OR gate 3, the output C (e.g., self-generated output signal C) from the count number decoder 17 is not (and cannot be) at a high level.

Thus, since the output-selecting signal SS from the selecting F/F 11 is at a low level at all times, the selector 12 selects the output signal B from the count number decoder 17 as the input-masking signal MI. More specifically, the state is repeated where the edge-detecting signal E is disabled for 60 μs after the trailing edge-detecting circuit 1 has detected trailing of the composite synchronizing signal SY (e.g., the edge-detecting signal E has been outputted).

Then, when the horizontal synchronizing inputs are lost, the self-generated output signal C is switched to a high level similarly to the conventional circuit. Thus, since the selecting F/F 11 is set, and the selecting signal SS is switched to a high level, the selector 12 selects the output D from the count number decoder 17 as the input-masking signal MI.

Accordingly, in this case, a period of 35 μs exists during which the edge-detecting signal B is disabled after a horizontal synchronizing output SH produced by self-generation has been outputted. The disabling period greatly assists in detection of horizontal synchronizing inputs when narrow pulse signals are lost during vertical synchronous periods, and allows normal (and immediate) extraction of the horizontal synchronizing inputs regardless of the difference of the odd/even fields and allows outputting of the corresponding horizontal synchronizing output SH. This is a key feature of the present invention.

Referring to FIGS. 3(A) and 3(B), which illustrate the relationship among the composite synchronizing signal SY with lost narrow pulses during the vertical synchronous periods, the input-masking signal MI and the horizontal synchronizing signal SH for each of the odd/even fields, and the operation for extracting the horizontal synchronizing inputs will be described for the odd field and the even field. As mentioned above, with the conventional circuit, horizontal synchronizing inputs may be extracted erroneously immediately after the vertical synchronous periods. Hereinbelow, it will be described that the horizontal synchronizing inputs may be accurately extracted for either of the odd/even fields according to the present embodiment.

First, for the odd field illustrated in FIG. 3(A), the start of the vertical synchronous periods coincides with the timing of the horizontal synchronizing inputs H, and the trailing edge-detecting circuit 1 detects the trailing of the composite synchronizing signal SY at this timing. Then, the process proceeds as according to the conventional circuit.

With the composite synchronizing signal SY actually inputted through an input terminal TI, since narrow pulse signals during the vertical synchronous periods become flat, self-generated horizontal synchronizing outputs SH are outputted during the vertical synchronous periods without error.

Here, since the self-generated output signal C is switched to a high level, the selector 12 selects the output signal D from the count number decoder 17 as the input-masking signal MI. Since each vertical synchronous period spans three cycles of the horizontal synchronizing inputs H, the horizontal synchronizing output by self-generation is repeated three times. The vertical synchronous period is completely terminated at the time when the third self-generated output has been performed. Then, the trailing edge of the composite synchronizing signal SY is inputted, which is an equalizing pulse Q, but not a horizontal synchronizing input H, as is apparent from FIG. 3(A). The equalizing pulse Q is the same as equalizing pulse Q described above with regard to the conventional circuit, and provides the same function (e.g., to recognize the vertical synchronous period).

According to the first embodiment, since there is an input-disabling period of 35 $\mu$s after the self-generation of the horizontal synchronizing output SH, the equalizing pulse Q is disabled, and thus no corresponding horizontal synchronizing output SH is outputted. Thus, an advantage gained by using a disabling period of 35 $\mu$s is that the edge-detecting signal E is disabled after a horizontal synchronizing output SH produced by self-generation has been outputted, and this disabling period provides time for detection of the horizontal synchronizing inputs when narrow pulse signals are lost during vertical synchronous periods, and that such can be performed during odd and even fields.

Further, the difference is clearly shown between the timing charts of FIGS. 9(A) and 9(B) of the conventional circuit and those of FIGS. 3(A) and 3(B) of the present invention.

For the odd field (FIG. 3(A)), since the input-disabling period has already been terminated when a horizontal synchronizing input is inputted after the equalizing pulse Q, the input signal at this point in time (e.g., a horizontal synchronizing input) may be received. Subsequent operation is the same as that of the conventional circuit.

Then, for the even field as shown in FIG. 3(B), since the vertical synchronous period starts between the horizontal synchronizing inputs, the trailing edge of the composite synchronizing signal SY, which is first inputted after a third horizontal synchronizing input H has been produced by self-generation, is the horizontal synchronizing input H. Accordingly, the horizontal synchronizing signal H may be received as is. Here, since the input-disabling period of 35 $\mu$s has already been terminated, the input is not disabled. As shown in FIGS. 3(A) and 3(B), the effects of the invention are shown by referring to the vertical synchronous period.

As described above, according to the present embodiment, even when the composite synchronizing signal SY has lost narrow input signals such as serrated pulses and horizontal synchronizing inputs during the vertical synchronous period, horizontal synchronizing inputs may be accurately detected to generate horizontal synchronizing outputs SH, regardless of the odd/even fields.

Figure 4:
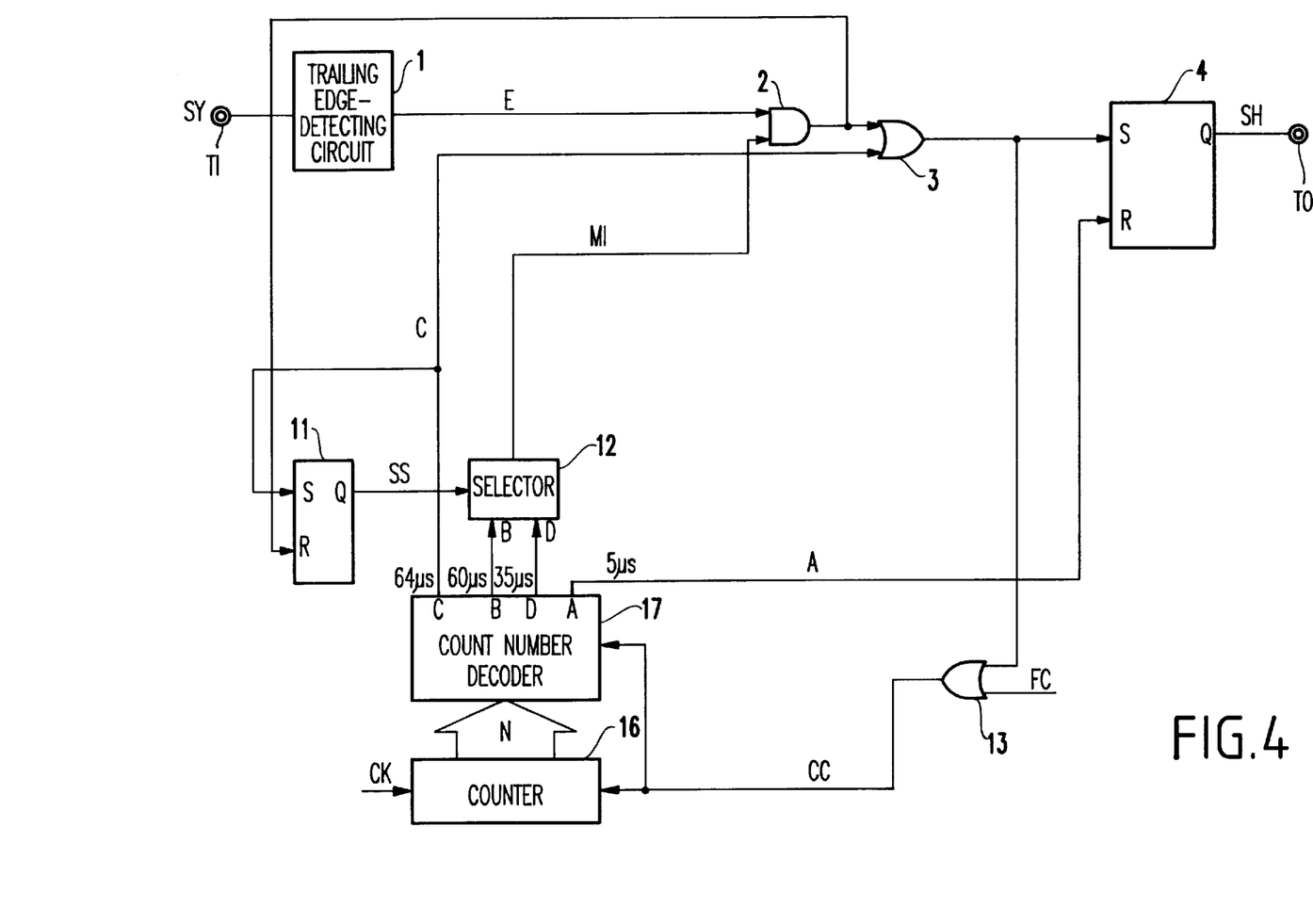
FIG. 4 is a block diagram illustrating a second embodiment of the horizontal synchronizing signal-generating circuit according to the present invention.

Referring to FIG. 4 which is a block diagram illustrating a second embodiment according to the present invention, wherein the same components as illustrated in FIG. 1 are indicated by the same reference letters/numerals, the second embodiment differs from the first embodiment by the addition of an OR gate 13 which performs an OR operation between the output signal from the OR gate 3 and the forced counter-clearing signal FC to generate a counter-clearing signal CC.

Although the counter 6 is initialized when the edge (e.g., trailing edge, but as mentioned above the invention could alternatively or additionally utilize the leading edge) of a composite synchronizing signal SY is detected or when the count number decoder 17 generates a self-generated output signal C according to the first embodiment, the counter 6 may be forcibly initialized according to the second embodiment, in addition to when the conditions described above are satisfied. That is, the counter 6 is initialized when the forced counter-clearing signal FC is switched to a high level, regardless of the other conditions.

Figure 5A:
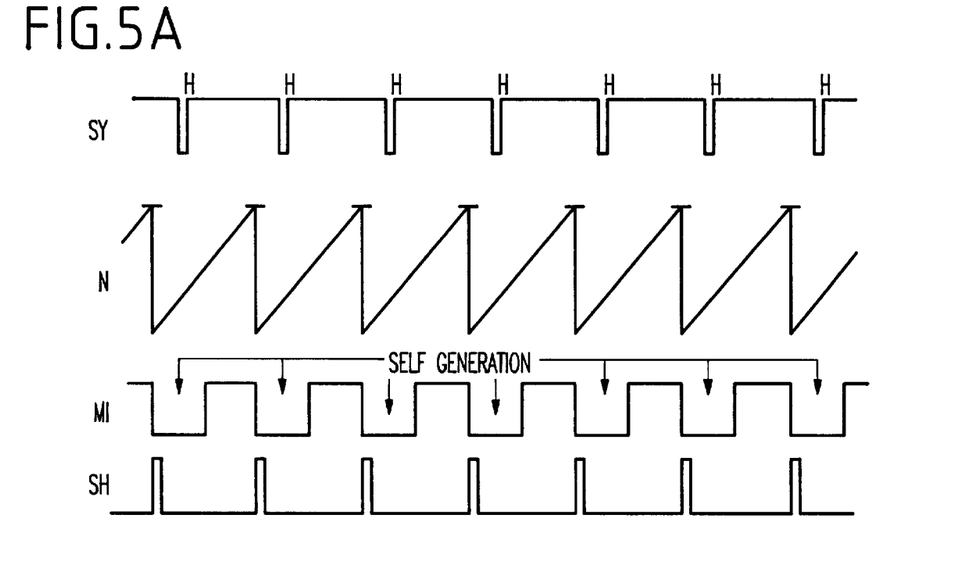
FIGS. 5(A) and 5(B) show timing charts for illustrating the relationship between the horizontal synchronizing input and the input-disabled period under abnormal conditions and at the time of forced counter-clearing, respectively.
Figure 5B:
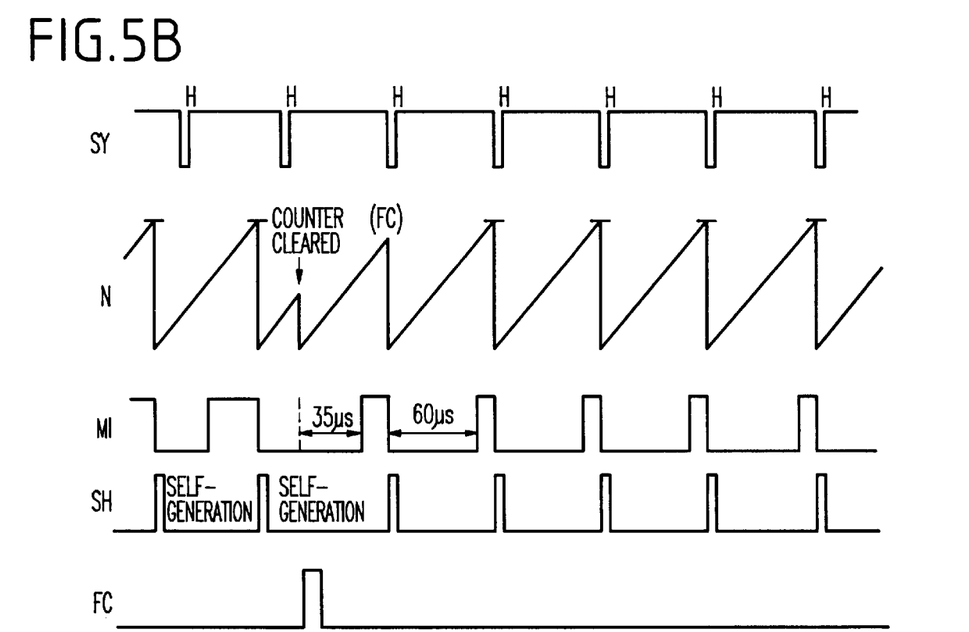

Referring to FIGS. 5(A) and 5(B) which is a timing chart illustrating the relationship between the horizontal synchronizing input and the input-disabled period, the reason for the forced initializing function will be explained, and specifically matching the H period to the masking period.

According to the first embodiment, the edge-detecting signal E is disabled for 35 $\mu$s after a self-generated output SH has been outputted. Therefore, when the timing of initializing of the counter 6 or the phase of the inputted composite synchronizing signal SY changes, the horizontal synchronizing input coincides with the input-disabled period described above, as shown in FIG. 5(A). Thus, a horizontal synchronizing output SH may be self-generated at all times.

Therefore, the counter 6 incorporates a structural feature which allows its initialization at any desired time to prevent coincidence of the horizontal synchronizing input period and the input-disabled period.

An example of the timing of inputting a forced counter-clearing signal FC is illustrated in FIG. 5(E). This operation may be advantageously performed at the start of operation of the horizontal synchronizing signal-generating circuit according to the present invention or when the phase of the composite synchronizing signal SY changes. It need not be performed each time the vertical synchronization is detected. The operation other than the initialization of the counter 6 is the same as that of the conventional circuit, and thus reference thereto is omitted. With the invention, the H period is matched to the masking period. Further, the detector is used to measure the lack of coincidence between H and MI signals.

As described above, the invention has a selector which selects one of the second match-indicating signals as the input-masking signal, and a selector control means which inputs the self-generated output signal and the first logical signal corresponding to the edge-detecting signal to switch between the operations of the selector. As a result, the horizontal synchronizing signal-generating circuit according to the present invention allows separation of horizontal synchronizing inputs immediately after output of self-generated horizontal synchronizing signals without being mistaken for equalizing pulses, even when composite synchronizing signals with lost horizontal synchronizing inputs are inputted during vertical synchronous periods.

Specifically, by disabling the input of composite synchronizing signals for a period approximately half the period of the horizontal synchronizing signals, even after self-generation of the horizontal synchronizing output signals, horizontal synchronizing inputs are accurately extracted and are outputted as horizontal synchronizing output signals, regardless of whether the composite synchronizing signals are odd/even fields.

Further, while a timing of 35 $\mu$s has been given above, any suitable interval may be selected by the designer according to the constraints and design specifications of the system.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A horizontal synchronizing signal-generating circuit, comprising:
   a count number decoder having a first setting and a plurality of second settings corresponding to self-generated output times, for outputting, in response to a match of a counted value with each of the first and second settings, a corresponding first match-indicating signal and a plurality of second match-indicating signals, and for initializing the plurality of match-indicating signals in response to a counter-clearing signal;
   a first logical circuit for receiving an edge-detecting signal and an input-masking signal, and for enabling or disabling the edge-detecting signal in response to a level of the input-masking signal, and for outputting a first logical signal;
   a second logical circuit for performing a logical operation between the first match-indicating signal and the first logical signal to output a second logical signal; and
   a selector for selecting one of said second match-indicating signals to output it as said input-masking signal.

2. A circuit according to claim 1, further comprising:
   an edge-detecting circuit for detecting, in response to supply of a composite synchronizing signal including a horizontal synchronizing signal and a vertical synchronizing signal, an edge of the composite synchronizing signal, and for outputting said edge-detecting signal to said first logical circuit.

3. A circuit according to claim 2, further comprising:
   a counter for counting clock signals to output the counted value, and for initializing the counted value in response to the counter-clearing signal.

4. A circuit according to claim 3, further comprising:
   an output device for outputting a predetermined horizontal synchronizing output signal in response to the second logical signal and terminating the predetermined horizontal synchronizing output signal after a predetermined time period, and for extracting the horizontal synchronizing signal from the composite synchronizing signal to generate the horizontal synchronizing signal.

5. A circuit according to claim 4, further comprising:
   a selector controller for inputting the first match-indicating signal and said first logical signal to switch between operations of said selector.

6. A circuit according to claim 1, wherein said count number decoder issues a disabling signal to said selector such that said edge-detecting signal is disabled for a predetermined period.

7. A horizontal synchronizing signal-generating circuit as claimed in claim 6, wherein said predetermined period during which said edge-detecting signal is disabled changes depending on whether said composite synchronizing signal is normally inputted, or the self-generation of said horizontal synchronizing output signal has been performed in response to an abnormal input.

8. A horizontal synchronizing signal-generating circuit as claimed in claim 5, wherein a period during which said edge-detecting signal is disabled changes depending on whether said composite synchronizing signal is normally inputted, or the self-generation of said horizontal synchronizing output signal has been performed in response to an abnormal input.

9. A horizontal synchronizing signal-generating circuit as claimed in claim 5, wherein said period in which said edge-detecting signal is disabled is set to a fraction of a cycle of the horizontal synchronizing signal.

10. A horizontal synchronizing signal-generating circuit as claimed in claim 9, wherein said period is set to be half the cycle of the horizontal synchronizing signal.

11. A horizontal synchronizing signal-generating circuit as claimed in claim 10, wherein said period is 35 $\mu$s.

12. A horizontal synchronizing signal-generating circuit as claimed in claim 1, wherein said counter-clearing signal comprises said second logical signal.

13. A horizontal synchronizing signal-generating circuit as claimed in claim 1, further comprising forced counter-clearing means for generating said counter-clearing signal in response to supply of an external control signal.

14. A horizontal synchronizing signal-generating circuit as claimed in claim 1, wherein said edge comprises one of a leading edge and a trailing edge of said composite signal.

15. A horizontal synchronizing signal-generating circuit as claimed in claim 1, wherein said second logical circuit performs a logical OR operation.

16. A horizontal synchronization signal generating circuit for self-generating a horizontal synchronization signal, comprising:
   a logic circuit for outputting an actual horizontal synchronization signal;
   a decoder circuit, coupled to said logic circuit, for outputting a plurality of pulses at predetermined times in response to a counted output, said decoder comprising:
      a first output device for generating a self-generated horizontal synchronization pulse at a period greater than an actual horizontal synchronization pulse period;
      a second output device for outputting a first edge detection circuit disabling signal having a period less than said actual horizontal synchronization pulse period;
      a third output device for outputting a second edge detection circuit disabling signal having a period comprising a predetermined fraction of said actual horizontal synchronization pulse period; and a selector for selecting said first edge detection circuit disabling signal if said logic circuit outputs said actual horizontal synchronization signal, and for selecting said second edge detection circuit disabling signal if said logic circuit outputs said self-generated horizontal synchronization signal.

17. A circuit according to claim 16, further comprising:

an edge-detecting circuit for detecting said actual horizontal synchronization signal; and a counter being reset by said logic circuit upon detection of said actual horizontal synchronization signal, said first output device being connected to said logic circuit for outputting said self-generated pulse if said actual pulse fails to be detected by said edge-detecting circuit.

18. A horizontal synchronizing signal-generating circuit as claimed in claim 16, wherein said predetermined fraction is approximately half.

19. A horizontal synchronizing signal-generating circuit as claimed in claim 18, wherein said predetermined fraction comprises 35 $\mu$s.

20. A method of self-generating a horizontal synchronization signal generating circuit if an actual horizontal synchronization signal fails to be detected, said method comprising steps of:

detecting whether an actual horizontal synchronization signal exists;

outputting a plurality of pulses at predetermined times, said outputting step comprising:

generating a self-generated horizontal synchronization pulse at a period greater than an actual horizontal synchronization pulse period, said self-generated pulse being output if said actual horizontal synchronization signal fails to be detected in said detecting step;

outputting a first edge detection circuit disabling signal having a period less than said actual horizontal synchronization pulse period;

outputting a second edge detection circuit disabling signal having a period a predetermined fraction of said actual horizontal synchronization pulse period; and selecting said first edge detection circuit disabling signal if said actual horizontal synchronization signal is output, and selecting said second edge detection circuit disabling signal if said self-generated horizontal synchronization signal is output.

21. A method according to claim 20, further comprising a step of:

outputting said actual horizontal synchronization signal based on said detecting step.

22. A method according to claim 21, further comprising a step of:

resetting a counter upon detection of said actual horizontal synchronization signal.

23. A method according to claim 20, wherein said period changes depending on whether a composite synchronizing signal is normally inputted, or the self-generation of said horizontal synchronization signal has been performed in response to an abnormal input.

24. A method according to claim 20, wherein said period having said predetermined fraction is substantially half of a cycle of the actual horizontal synchronization pulse period.

25. A method according to claim 24, wherein said period having said predetermined fraction is 35 $\mu$s.

* * * * *